United States Patent
Fell et al.

(10) Patent No.: US 7,219,529 B2
(45) Date of Patent: May 22, 2007

(54) METHOD AND APPARATUS FOR MEASURING SCALEFACTOR VARIATION IN A VIBRATING STRUCTURE GYROSCOPE

(75) Inventors: Christopher P Fell, Plymouth (GB); Kevin Townsend, Plymouth (GB); Andrew Kazar, Plymouth (GB)

(73) Assignee: BAE Systems plc, London (GB)

( * ) Notice: Subject to any disclaimer, the term of this patent is extended or adjusted under 35 U.S.C. 154(b) by 136 days.

(21) Appl. No.: 10/523,398

(22) PCT Filed: Nov. 12, 2003

(86) PCT No.: PCT/GB03/04913

§ 371 (c)(1),
(2), (4) Date: Feb. 3, 2005

(87) PCT Pub. No.: WO2004/046650

PCT Pub. Date: Jun. 3, 2004

(65) Prior Publication Data

US 2005/0257596 A1    Nov. 24, 2005

(30) Foreign Application Priority Data

Nov. 20, 2002 (GB) .................................. 0227084.1

(51) Int. Cl.
*G01C 25/00* (2006.01)
(52) U.S. Cl. ........................................ 73/1.77; 702/116
(58) Field of Classification Search ................. 73/1.77, 73/1.37; 702/116, 88, 92, 96
See application file for complete search history.

(56) References Cited

U.S. PATENT DOCUMENTS 4,075,701 A * 2/1978 Hofmann ..................... 702/116

(Continued)

FOREIGN PATENT DOCUMENTS

EP           0 492 739           7/1992

(Continued)

*Primary Examiner*—Thomas P. Noland
(74) *Attorney, Agent, or Firm*—Nixon & Vanderhye P.C.

(57) ABSTRACT

Apparatus for measuring variation in scalefactor from a predetermined value for a vibrating structure gyroscope has a vibrating structure (R), fixed primary and fixed secondary drives (1, 13) for putting and maintaining the vibrating structure (R) in vibrating resonance, fixed primary and fixed secondary pick offs (2, 6) for detecting vibration of the vibrating structure (R), with the drives and pick offs (1, 13, 2, 6) being located radially around the vibrating structure (R), quadrature component and real component loop systems (7, 8), automatic gain control and phase locked loop systems (5, 22), a sin/cos pick off resolver (38) for receiving signals from the primary and secondary pick offs (2, 6) and for outputting signals to the quadrature component and real component loop systems (7, 8) and to the automatic gain control and phase locked loop systems (5, 22), a sin/cos drive resolver (37) for receiving output signals from the quadrature component and real component loop systems (7, 8) and from the automatic gain control and phase locked loop systems (5, 22) and for feeding control signals to the primary and secondary drives (1, 13), and an angular displacement control (40) for feeding angular displacement control signals to the sin/cos drive and pick off resolvers (38, 37) to control uniform displacement of the resolved carrier and response mode drives and pick offs axes angularly around the vibrating structure (R), with respect to a central axis of the vibrating structure, at a known rate.

13 Claims, 4 Drawing Sheets

U.S. PATENT DOCUMENTS

| | | | |
|---|---|---|---|
| 4,703,815 A | * | 11/1987 | Hirano et al. .............. 702/88 X |
| 4,797,841 A | * | 1/1989 | Hatch .......................... 702/92 |
| 5,270,959 A | * | 12/1993 | Matsuzaki et al. ....... 73/1.77 X |
| 5,621,171 A | * | 4/1997 | Fell .......................... 73/1.77 X |
| 5,795,988 A | * | 8/1998 | Lo et al. ...................... 73/1.77 |
| 5,866,796 A | * | 2/1999 | Chia et al. .................... 73/1.75 |
| 5,889,193 A | * | 3/1999 | Pfaff et al. ................... 73/1.37 |
| 6,591,209 B1 | * | 7/2003 | Romano et al. .............. 702/96 |
| 6,725,169 B2 | * | 4/2004 | Thielman et al. ......... 702/92 X |
| 2006/0260382 A1 | * | 11/2006 | Fell et al. .................... 73/1.38 |

FOREIGN PATENT DOCUMENTS

| | | | |
|---|---|---|---|
| GB | 2 251 072 | | 6/1992 |
| GB | 2322196 A | * | 8/1998 |
| GB | 2329471 A | * | 3/1999 |
| JP | 2001-21362 | | 1/2001 |
| WO | WO 01/53776 | | 7/2001 |
| WO | WO 01/77620 | | 10/2001 |

\* cited by examiner

Fig.1A.

Carrier

Fig.1B.

Response

METHOD AND APPARATUS FOR MEASURING SCALEFACTOR VARIATION IN A VIBRATING STRUCTURE GYROSCOPE

This application is the US national phase of international application PCT/GB2003/004913, filed in English on 12 Nov. 2003, which designated the US. PCT/GB2003/004913 claims priority to GB Application No. 0227084.1 filed 20 Nov. 2002. The entire contents of these applications are incorporated herein by reference.

BACKGROUND OF THE INVENTION

1. Field of the Invention

This invention relates to a method and apparatus for measuring scalefactor variation in a vibrating structure gyroscope.

2. Discussion of Prior Art

There are many known implementations of vibrating structure gyroscopes (VSG). These make use of a wide variety of resonant structures including vibrating beams, tuning forks, hemispherical shells & planar rings. These may be fabricated using numerous techniques using a range of materials. Structures fabricated from silicon using micromachining techniques have the particular advantage that they may be produced in large numbers and at low cost whilst maintaining a high degree of performance. This makes them particularly suitable for applications demanding high volumes of low cost sensors. One such application is for yaw rate sensing in advanced braking systems for automotive vehicles.

Many of the applications for these sensors are critical to the safe operation of the vehicle. The integrity of the gyroscope output is of paramount importance as it is used to control the functionality of such systems. In the advanced braking system application this signal is used to control the application of the brakes. System designers therefore require a very high degree of Built in Test (BIT) coverage on such sensors. Techniques for testing the basic functionality of such devices are known, and disclosed, for example in U.S. Pat. No. 5,866,796A and U.S. Pat. No. 5,889,193A. While these known techniques provide a good level of coverage they are not able to test for failures associated with scalefactor (the scaling, that is change, of the sensor output in response to a given applied rate of rotation). Such errors can result in the rate measurement indication of the sensor being significantly different from the true rotation or even absent entirely in some circumstances. This can result in the system failing to operate or operating erroneously with potentially disastrous consequences.

There is thus a need for a means or technique for providing BIT coverage of accurate scalefactor operation of VSG sensors. Preferably this functionality should be provided without the requirement for additional hardware and without additional expense.

SUMMARY OF THE INVENTION

According to a first aspect of the present invention there is provided a method for measuring variation in scalefactor from a predetermined value of a vibrating structure gyroscope having a vibrating structure, a fixed primary and a fixed secondary drive means for putting and maintaining the vibrating structure in vibratory resonance, and a fixed primary and a fixed secondary pick off means for detecting vibration of the vibrating structure, with the drive and pick off means being located radially around the vibrating structure, in which:

the outputs from the drive and pick off means are combined to generate resolved carrier and response mode drives and pick offs, and the resolved carrier and response mode drives and pick offs axes are angularly displaced uniformly around the vibrating structure, with respect to a central axis of the vibrating structure, at a known rate, at which the scalefactor $SF_{CAL}$ is equal to the predetermined scalefactor value $SF_{RATE}$ divided by the Bryan Factor $G_B$ which is a constant set by the vibrating geometry and vibration mode shape.

Preferably the vibrating structure is substantially planar, substantially ring shaped, having substantially identical carrier and response modes.

Conveniently a drive signal $V_{CD}\cos 2\alpha$ is applied to the fixed primary drive means at an angle of 0° and a signal $V_{CD}\sin 2\alpha$ is applied to the fixed secondary drive means at an angle of 45° to provide a resultant carrier mode drive force at an angle $\alpha$.

Advantageously a drive signal $-V_{RD}\sin 2\alpha$ is applied to the fixed primary drive means at an angle of 0° and a signal $V_{RD}\cos 2\alpha$ is applied to the fixed secondary drive means at an angle of 45° to provide a resultant response mode drive force at an angle $(\alpha+45°)$.

Preferably the output of the fixed primary pick off means at an angle of 0° and of the fixed secondary pick off means at an angle 45° are combined to give a carrier mode pick off signal $V_{CPO}=(V_{PPO}\cos 2\alpha+V_{SPO}\sin 2\alpha)$ representative of the amplitude of vibrational motion resolved at an angle $(\alpha+270°)$.

Conveniently the output of the fixed primary pick off means at an angle of 0° and of the fixed secondary pick off means at an angle 45° are combined to give a response mode pick off signal $V_{RPO}=(V_{SPO}\cos 2\alpha-V_{PPO}\sin 2\alpha)$ representative of the amplitude of vibrational motion resolved at an angle $(\alpha+135°)$.

Advantageously the predetermined scalefactor value $SF_{RATE}$ is the scalefactor measured when rotating the vibrating structure gyroscope in a conventional test manner.

Preferably the carrier and response mode drive and pick off axes are angularly displaced uniformly around the vibrating structure at a fixed rate through a fixed angle and then displaced back to start position at the same rate.

Conveniently the carrier and response mode drive and pick off axes are angularly displaced around the vibrating structure at a constant rate in a single direction.

Advantageously the carrier and response mode drive and pick off axes are angularly displaced uniformly around the vibrating structure at a fixed rate through a fixed angle in an oscillatory manner on either side of a fixed start position.

According to a second aspect of the present invention there is provided apparatus for measuring variation in scalefactor from a predetermined value for a vibrating structure gyroscope having a preferably substantially planar, substantially ring shaped, vibrating structure, a fixed primary and a fixed secondary drive means for putting and maintaining the vibrating structure in vibrating resonance, a fixed primary and a fixed secondary pick off means for detecting vibration of the vibrating structure, with the drive and pick off means being located radially around the vibrating structure, quadrature component and real component loop systems, an automatic gain control and phase locked loop systems, a sin/cos pick off resolver for receiving signals from the primary and secondary pick off means and for outputting signals to the quadrature component and real component loop systems and to the automatic gain control and phase locked loop systems, a sin/cos drive resolver for receiving output signals from the quadrature component and real component loop systems and from the automatic gain control and phase locked loop systems and for feeding control signals to the primary and secondary drive means, and an angular displacement control for feeding angular displacement control signals to the sin/cos drive and pick off resolvers to control uniform displacement of the resolved carrier and response mode drives and pick off axes angularly around the vibrating structure, with respect to a central axis of the vibrating structure, at a known rate.

Preferably the vibrating structure is substantially planar, substantially ring shaped and has substantially identical carrier and response modes.

Conveniently the apparatus includes demodulators for receiving signals from the sin/cos pick off resolver and for outputting demodulated signals to the quadrature component and real component loop systems, remodulators for receiving and remodulating output signals from the quadrature component and real component loop systems, demodulators for receiving signals from the sin/cos pick off resolver and for outputting demodulated signals to the automatic gain control and phase locked loop systems and a remodulator for receiving and remodulating signals outputted by the automatic gain control and phase locked loop system and for passing a remodulated output signal to the sin/cos drive resolver.

BRIEF DESCRIPTION OF THE DRAWINGS

For a better understanding of the present invention, and to show how the same may be carried into effect, reference will now be made, by way of example, to the accompanying drawings, in which:—

DETAILED DISCUSSION OF EMBODIMENTS

Figure 1A:
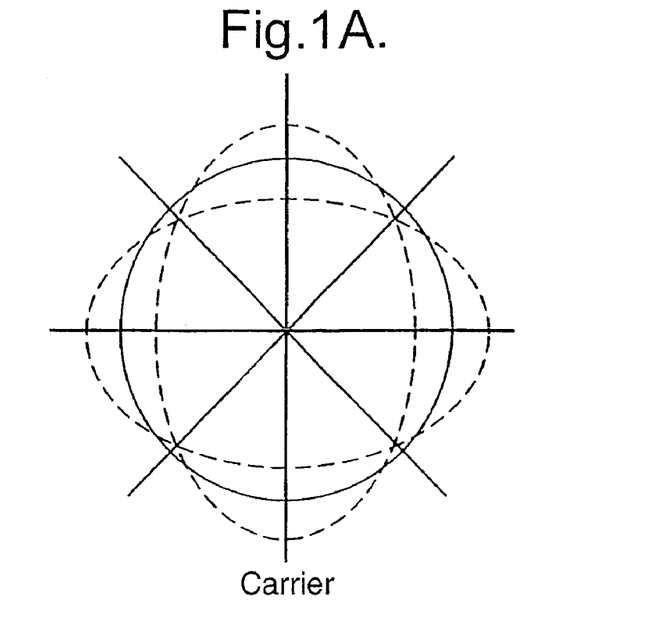
FIG. 1A is a graphic illustration of the carrier mode vibration pattern for a conventional silicon vibrating structure gyroscope.
Figure 1B:
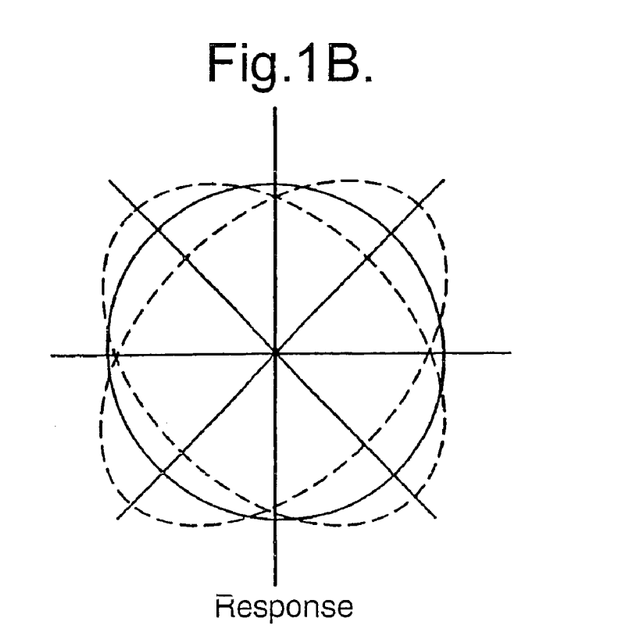
FIG. 1B is a graphic illustration of the response mode vibration pattern for a conventional silicon vibrating structure gyroscope.

The present Applicants GB 2,322,196 describes a sensor device which may be fabricated using micro-machining techniques, and which is suitable for use in high reliability high volume applications. The sensor consists of a crystalline silicon planar ring R externally mounted by eight compliant support legs on an external frame. This known sensor typically is driven in cos 2θ vibration modes as shown schematically in FIGS. 1A and 1B of the accompanying drawings. One mode (FIG. 1A) is excited as the carrier mode. When the sensor is rotated around the axis normal to the plane of the ring, Coriolis forces, $F_c$, are developed which couple energy into the response mode (FIG. 1B). The magnitude of the force is given by:

$$F_c = 2mv\Omega_{app} \quad (1)$$

where m is the modal mass, v is the effective velocity and $\Omega_{app}$ is the applied rotation rate. The carrier mode vibration amplitude is typically maintained at a fixed level. This also maintains the velocity, v, at a fixed level and hence ensures that the developed Coriolis forces are directly proportional to the rotation rate, $\Omega_{app}$. The amplitude of the motion induced by these Coriolis forces may be enhanced by accurately matching the resonant frequencies of the carrier and response modes. The motion is then amplified by the Q of the response mode giving enhanced device sensitivity. When operating in this open loop mode the sensitivity (scalefactor) of the device will be dependent on the Q (relationship between the stored energy and the rate of dissipation of energy) of the secondary mode, which may vary significantly over the operating temperature range. This dependence may be eliminated by operating the sensor in closed loop (force feedback) mode. In this mode the induced response mode motion is actively nulled with the applied force required to achieve this now being directly proportional to the rotation rate.

Figure 2:
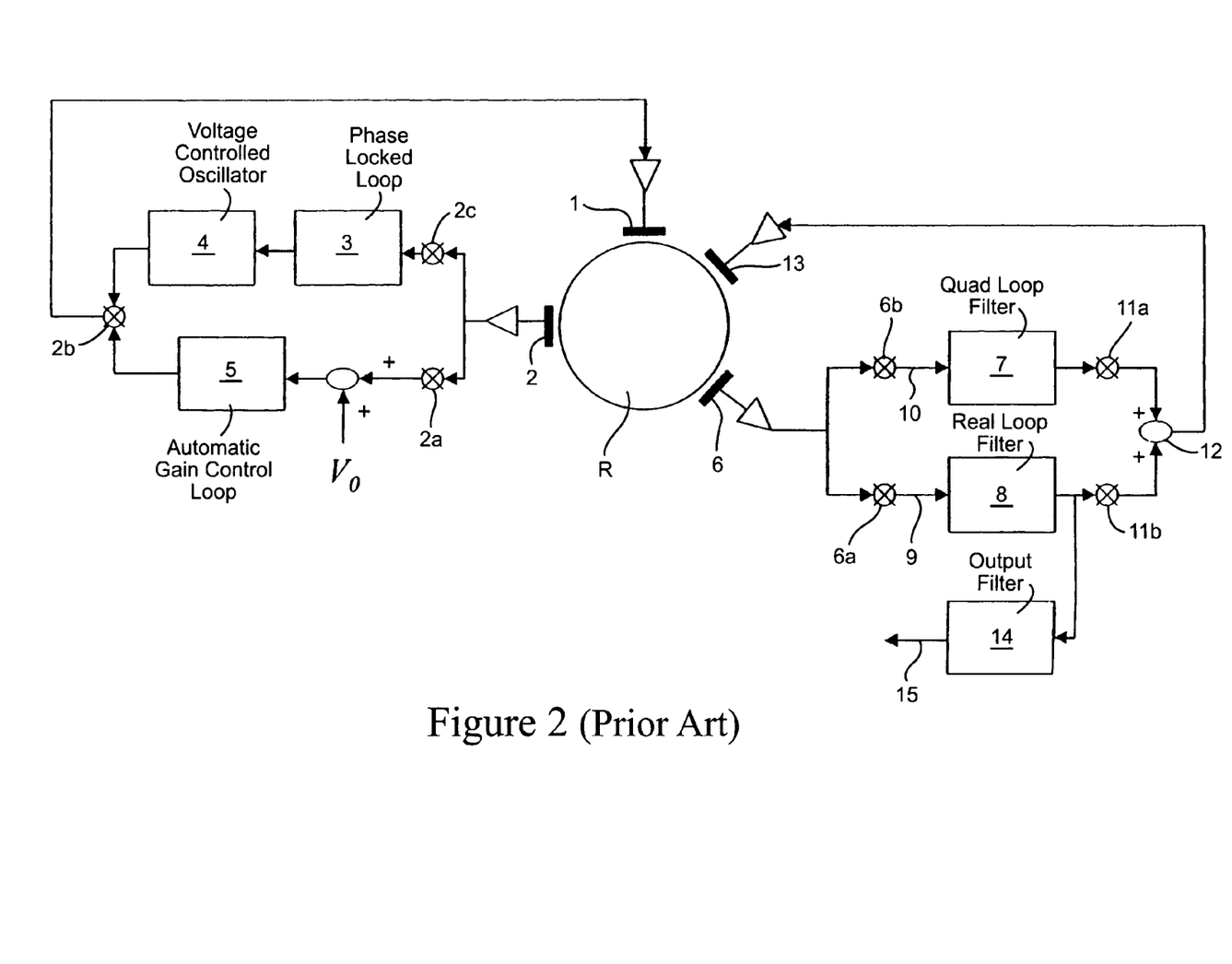
FIG. 2 is a schematic diagram of a conventional analogue closed loop control system for a vibrating structure gyroscope.

Closed loop operation may typically be implemented conventionally using the control loops shown schematically in FIG. 2 of the accompanying drawings. The carrier mode motion is excited by means of the primary drive 1, and detected at the primary pick off 2. This signal is demodulated at demodulators 2a and 2c which separate the real and quadrature components respectively, prior to application to the carrier mode control loops. The signals are then remodulated at remodulator 2b before application to the primary drive 1. A phase locked loop 3 compares the relative phases of the primary pick off and primary drive signals and adjusts a voltage controlled oscillator 4 frequency to maintain a 90 degree phase shift between the applied drive and the resonator motion. This maintains the motion at the resonance maximum. The primary pick off signal is also applied to an automatic gain control loop 5 which compares the signal level to a fixed reference level $V_O$. The primary drive at remodulator 2b level is adjusted in order to maintain a fixed signal level (and hence amplitude of motion) at the primary pick off 2.

The response mode motion is detected at a secondary pick off 6. This signal is demodulated at demodulators 6a and 6b to separate the real and quadrature components of the signal which are applied to a quad loop filter 7 and a real loop filter 8, respectively. The real component is that which is in-phase with the carrier mode motion. Motion induced by applied rotation rates will generate a real signal component 9. The quadrature component 10 is an error term which arises due to the mode frequencies not being precisely matched. Loop filtering is applied to these demodulated baseband (DC) signals to achieve the required system performance (bandwidth etc.). The resultant signals are then remodulated at remodulator 11a, 11b, and summed together by adder 12 for application to the secondary drive 13 in order to maintain a null at the secondary pick off 6. The real baseband signal, SD(real), which is directly proportional to the real component of the response mode drive applied to the resonator ring R via the secondary drive 13, is scaled and filtered at an output filter 14 to produce a rate output signal 15.

For this mode of operation the scalefactor in response to an applied rotation rate, is given by:

$$SF_{RATE} = \frac{G_B V_0 \omega}{k g_{PPO} g_{SD}} \quad (2)$$

where $V_0$ is the carrier mode amplitude set level, ω is the carrier mode resonance frequency, k is a constant including the resonator dimensions, $G_B$ is the Bryan Factor (modal coupling coefficient), $g_{PPO}$ is the primary pick off gain and $g_{SD}$ is the secondary drive gain.

Figure 3:
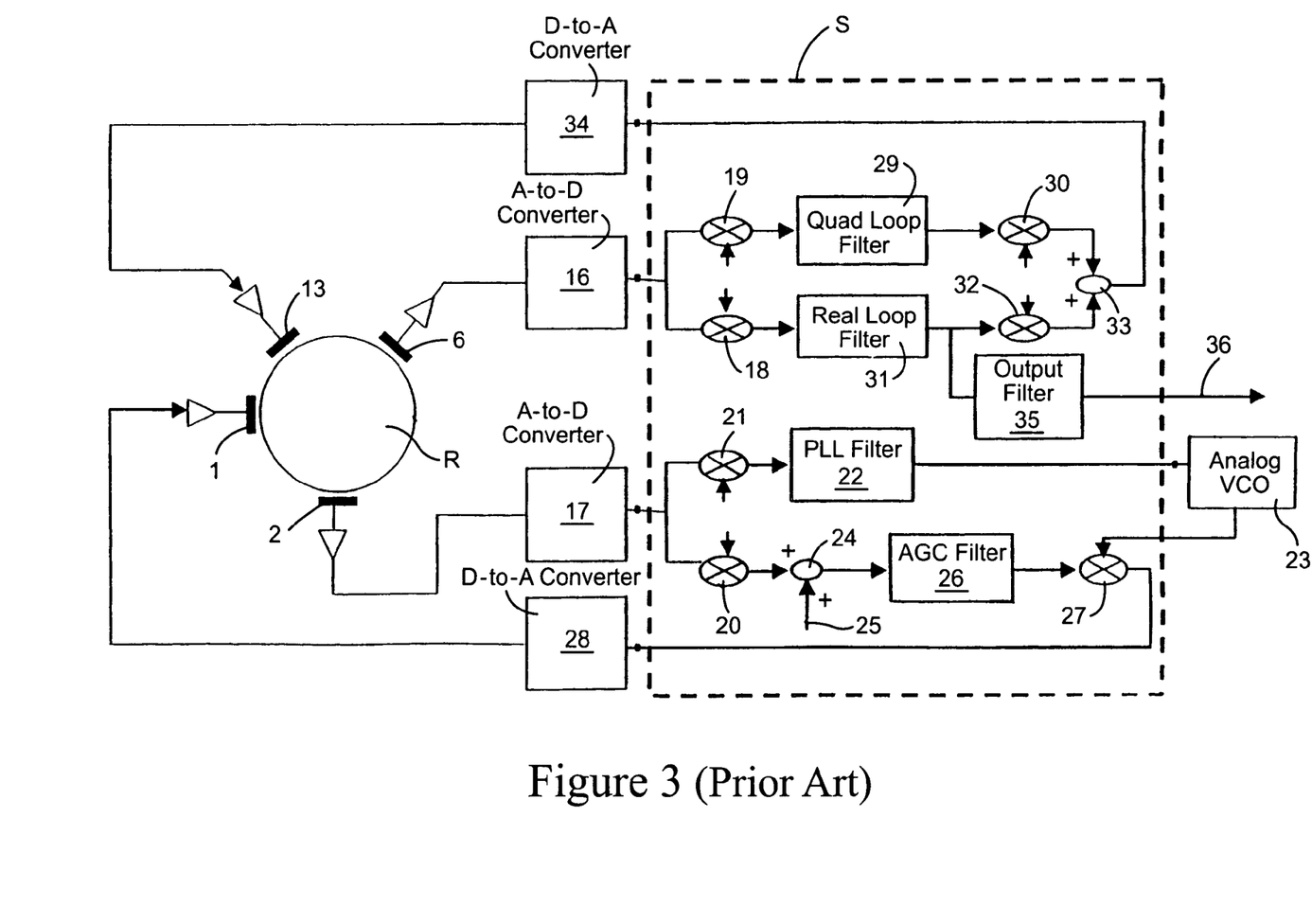
FIG. 3 is a schematic diagram of a conventional digital electronic control system for a vibrating structure gyroscope.

The sensor device described in GB 2,322,196 may also be used in conjunction with a digital electronic control system such as described in GB 2,329,471. This scheme is shown in FIG. 3 of the accompanying drawings. For this implementation the signals from the primary and secondary pick offs 2, 6 are digitised directly at analogue to digital converters 16, 17. Demodulation is then implemented in software for the real channel at demodulator 18 and for the quadrature channel at demodulator 19 for the secondary pick off 6, and for the primary pick off 2 for the real channel at demodulator 20 and for the quadrature channel at demodulator 21. The phase locked loop and automatic gain control loop functions are implemented as software functions.

The quadrature channel demodulator 21 separates the quadrature component of the signal from the analogue to digital converter 17 and applies it to a phase locked loop filter 22 and from thence to an analogue voltage control oscillator circuit 23. The VCO circuit 23 is driven at the carrier mode resonant frequency by a digital control word and controls the timing of the modulation and drive updates. The real channel demodulator 20 separates the real component of the signal from the analogue to digital converter 17 and applies it to an adder 24 at which it is summed with an automatic gain control set level signal 25 and the resulting signal passed to an, automatic gain control filter 26. The output from the AGC filter 26 is passed to a remodulator 27 driven by the VCO 23, to form the drive level for the primary drive 1 to which it is passed via a digital to analogue converter 28.

The quadrature channel demodulator 19 separates the quadrature component of the secondary pick off 6 output signal and applies it to a quad loop filter 29 and from thence to a remodulator 30. Similarly the secondary pick off 6 output signal is passed to the real channel demodulator 18 which separates the real component and applies it to a real loop filter 31 and from thence to a remodulator 32. The output signals from the remodulators 30, 32 are summed by adder 33 whose output provides a drive signal to the secondary drive 13 via a digital to analogue converter 34. The output signal from the real channel loop filter 31 also is passed through an output filter 35 to give appropriate characteristics to form a rate output signal 36.

Conventionally the scalefactor of the sensor device of GB 2,322,196 may be measured by mounting it on a rate table and applying known rotation rates about the sensitive axis. The sensor output can then be adjusted to give a calibrated scalefactor which is typically defined in units of millivolts, or in bits for the digital implementation, per degree per second of rotation. This procedure is typically performed prior to the installation of the sensor in the final application system. This calibration cannot subsequently be checked without dismantling the system to remove the gyroscope or subjecting the entire structure to accurately known rotation rates.

It is known that the scalefactor for sensor devices such as these, will vary to some degree over the operating temperature range of the sensor. For the sensor device described in GB 2,322,196 this variation is largely attributable to changes in primary pick off, $g_{PPO}$, and secondary drive, $g_{SD}$, gains and also due to variation in the carrier mode resonance frequency $\omega$. Catastrophic failure, constituting mechanical failure of the resonant element R or complete non-functionality of elements of the electronic circuitry is typically detectable using conventional BIT techniques such as described in U.S. Pat. No. 5,866,796. These techniques do not however detect 'soft' failures where changes in gain, for example, result in the scalefactor exceeding the specification limits.

Rotation of the sensor results in the carrier mode, which is maintained at a fixed position on the ring shaped vibrating structure, rotating with respect to inertial space. It has now been found that this same result can be achieved by rotating the carrier and response mode drive and pick off axes with respect to the ring. This has the effect of forcing the carrier mode vibration pattern to precess around the ring to maintain alignment with the carrier mode drive axis. The response mode pick off axis may be similarly rotated to maintain a fixed angular separation with respect to the carrier mode drive axis. The inertia of the vibrational motion is such that there is a tendency for the vibration pattern to persist along the original vibration direction as the carrier mode drive is rotated around the ring. In an open loop system, the amplitude of motion along the response mode axis will be directly proportional to the rate of rotation of the carrier drive. In a closed loop system this residual motion is nulled by the response mode drive loops in the same way as the motion induced by the Coriolis forces is nulled in conventional operation.

Figure 4:
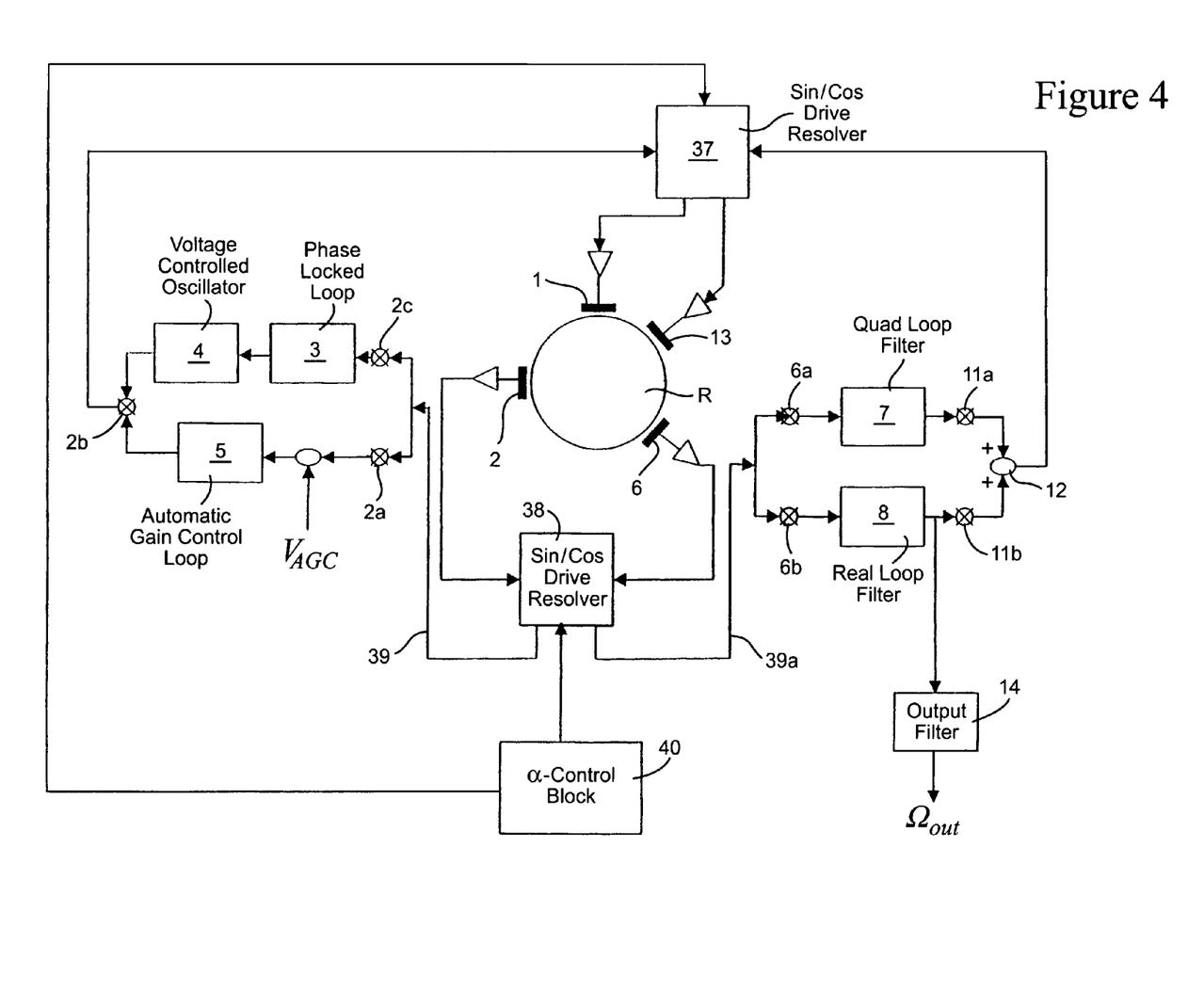
FIG. 4 is a schematic diagram of a circuit design according to the present invention.

The conventional circuit designs shown in FIGS. 2 and 3 may be modified according to the present invention to provide the appropriate mode axis rotation capability as shown in FIG. 4. In FIG. 4 components already identified in FIGS. 2 and 3 are given like reference numbers. In FIG. 4, a sin/cos drive resolver 37 distributes the carrier mode drive signal between the primary and secondary drive means 1, 13 transducers in the following proportions:

$$PD = V_{CD} \cos 2\alpha \qquad (3)$$

$$SD = V_{CD} \sin 2\alpha \qquad (4)$$

where $V_{CD}$ is the carrier mode drive level at the input to the drive resolver 37, PD the primary drive signal and SD the secondary drive signal. This gives a carrier mode drive force which acts at an angle $\alpha$ where $\alpha=0°$ is in the direction of the primary drive 1 transducer axis as shown in FIG. 4. Under normal operation, the carrier mode drive is applied purely on the primary drive transducer 1, (i.e. $\alpha=0°$).

The response mode drive is applied at an angle of 45° with respect to the carrier mode drive axis. This is achieved by applying drive signals as follows:

$$PD = -V_{RD} \sin 2\alpha \qquad (5)$$

$$SD = V_{RD} \cos 2\alpha \qquad (6)$$

where $V_{RD}$ is the response mode drive level at the input to the drive resolver 37. Under normal operation the response mode drive would be applied purely on the secondary drive transducer 13 (i.e. at $\alpha=45°$).

A sin/cos pick off resolver 38 provides a pick off signal 39 input to the demodulators 2a, and 2c as follows:

$$V_{CPO} = (V_{PPO} \cos 2\alpha + V_{SPO} \sin 2\alpha) \qquad (7)$$

where $V_{CPO}$ is the carrier voltage, $V_{PPO}$ the primary pick off voltage and $V_{SPO}$ the secondary pick off voltage. The voltage $V_{CPO}$ provides a signal representative of the vibrational motion resolved at an angle $(\alpha+270°)$. The output from demodulators 2a, 2c provides the input for carrier mode loops 5 and 3.

Pick off resolver 38 also provides a signal 39a for application to demodulators 6a and 6b as follows:

$$V_{RPO} = (V_{SPO} \cos 2\alpha - V_{PPO} \sin 2\alpha) \qquad (8)$$

where $V_{RPO}$ is the response voltage, $V_{SPO}$ the secondary pick off voltage and $V_{PPO}$ the primary pick off voltage. The voltage $V_{RPO}$ provides a signal representative of the vibrational motion resolved at an angle ($\alpha+135°$). Demodulators 6a and 6b separate the real and quadrature components of the signal $V_{RPO}$ for application to response mode loops 7 and 8.

It will be understood by those skilled in the art that the resolving elements may alternatively be applied to the demodulated pick off signals without changing the basic function of the technique.

The scalefactor in response to the displacement of the drive means axes is given by:

$$SF_{CAL} = \frac{V_0 \omega}{k g_{PPO} g_{SD}} \quad (9)$$

where $SF_{CAL}$ is the scalefactor, $V_O$ the carrier mode amplitude set level, $\omega$ the carrier mode resonance frequency, k a constant including the vibrating structure dimensions, $g_{PPO}$ the primary pick off gain and $g_{SD}$ the secondary drive gain.

For a given rate of drive means rotation, the scalefactor is therefore equal to $1/G_B$ times the scalefactor for the rotation of the sensor itself. The Bryan Factor, $G_B$, is a constant set by the geometry of the sensor structure and the vibration mode shape ($G_B$~0.33 for the sensor design of GB 2,322, 196). This factor GB is extremely stable under all conditions and has been shown to vary by less than 100 ppm over the full operating temperature range of the sensor device (–40 to +85° C.).

In order to derive information regarding the scalefactor, the angle $\alpha$ must be varied at a known rate $\alpha.dt$. Where the drive and pick off resolver blocks 37, 38 are implemented using analogue components an $\alpha$-control block 40 will output a voltage level which may be adjusted such that $\alpha$ may be varied over the required range of values. For the digital scheme, both the $\alpha$-control 40 function and the drive and pick off resolver blocks 37, 38 are implemented as software functions. The digital scheme therefore has the advantage that the scalefactor self calibration function may be implemented without the requirement for any additional hardware and at no additional cost.

A number of different BIT test strategies may be employed. In the preferred embodiment, the resolved carrier and response mode drive and pick off axes are angularly displaced around the vibrating structure R through a fixed angle then displaced back, at the same rate to the start position. This technique is particularly advantageous as it enables the effects of bias offsets to be eliminated. The bias results in an error at the output in the absence of applied rate. This bias will provide a constant polarity offset signal, $V_B$, for both the positive & negative drive rotations. For positive rotations the output will be given by:

$$V_{out} = \Omega_{CAL} \times SF_{CAL} + V_{BIAS} \quad (10)$$

and for negative rotations by:

$$V_{out} = -\Omega_{CAL} \times SF_{CAL} + V_{BIAS} \quad (11)$$

The difference between these two signals is then:

$$V_{DIFF} = (\Omega_{CAL} \times SF_{CAL} + V_{BIAS}) - (-\Omega_{CAL} \times SF_{CAL} + V_{BIAS})$$
$$= 2 \times \Omega_{CAL} \times SF_{CAL} \quad (12)$$

This measurement is therefore unaffected by the bias offset. The scalefactor in the calibration mode of operation is then given by:

$$SF_{CAL} = \frac{V_{DIFF}}{2 \times \Omega_{CAL}} \quad (13)$$

The rate scalefactor is therefore defined as:

$$SF_{RATE} = SF_{CAL} \times G_B \quad (14)$$

In operation this calibration procedure may be carried out periodically and the result compared to a reference value, which will typically be the factory calibration value set during the manufacturing process. For the analogue electronic implementation this will require the addition of dedicated circuitry. In the digital implementation this functionality can again be achieved within the software. Any deviation outside of the specified limits may be used to trigger an alarm function to indicate an in service device failure. For the analogue system, the alarm status will typically be indicated by setting the output voltage to a fixed, pre-defined value. On the digital system this status will be indicated by a given output word.

This calibration procedure has further advantages beyond its use in built in test applications. It may also be used to initially calibrate the scalefactor of the sensor device without the requirement for testing on a rate table. A typical set-up procedure for any gyroscope device is to place the device on a rate table & spin it around its sensitive axis at a known rate of rotation. The signal gain at the output is then adjusted to give a prescribed output voltage per degree per second of rotation. This process is time consuming & requires expensive test equipment. The self calibration procedure described here is capable of performing this function, to a high degree of accuracy, without the requirement for any test equipment. The scalefactor can be compared internally to a fixed reference value & the output gain adjusted automatically to achieve the required value.

A further advantage when employing this technique is that it can be used in operation & can hence be used to compensate for scalefactor variations induced by temperature variations or ageing effects. Both factors are known to change the performance characteristics of such devices. This technique provides a method of significantly improving the stability of a key gyroscope performance parameter.

In an alternative embodiment, the carrier response mode drive and pick off may be angularly displaced at a constant rate in a single direction. Displacement of $\alpha$ at a constant rate will superimpose a constant offset at the sensor output which will be indistinguishable from that generated by a real rotation applied to the sensor device. This technique may however, be used when the sensor is known to be stationary. In an automobile braking application this information may be available if other sensors are installed, such as wheel rotation sensors.

An alternative approach is to apply an oscillating input to the $\alpha$ control function in order to dither the mode position about a fixed carrier mode drive position (typically $\alpha=0°$). This will superimpose an oscillating rate signal onto the sensor output. The use of an oscillating input requires the induced response at the response mode drive to be accurately demodulated with respect to the applied oscillation signal. This has the disadvantage of adding significant complexity to the BIT test process. Again this signal could be controlled such that it is only activated only when the sensor platform is known to be stationary. Alternatively, the frequency of the imposed oscillation rate can be set to be outside of the normal operating bandwidth of the sensor such that any signals at this frequency are known to be generated by the BIT test.

The method and apparatus of the invention have been described with application to VSG designs utilising planar ring shaped resonators in conjunction with Cos 2θ vibration mode shapes. Those skilled in the art will appreciate that the method is also applicable to a range of VSG resonator structures employing a variety of vibration mode pairs. Whilst the method may theoretically be applied to structures which are typically operated using different carrier and response mode shapes (e.g. tuning forks) it is most conveniently applied to resonators employing identical carrier and response modes as described herein.

The invention claimed is:

1. Method for measuring variation in scalefactor from a predetermined value of a vibrating structure gyroscope having a vibrating structure, a fixed primary and a fixed secondary drive means for putting and maintaining the vibrating structure in vibratory resonance, and a fixed primary and a fixed secondary pick off means for detecting vibration of the vibrating structure, with the drive and pick off means being located radially around the vibrating structure, in which:

the outputs from the drive and pick off means are combined to generate resolved carrier and response mode drives and pick offs, and the resolved carrier and response mode drives and pick offs axes are angularly displaced uniformly around the vibrating structure, with respect to a central axis of the vibrating structure, at a known rate, at which the scalefactor $SF_{CAL}$ is equal to the predetermined scalefactor value $SF_{RATE}$ divided by the Bryan Factor $G_B$ which is a constant set by the vibrating structure geometry and vibration mode shape.

2. A method according to claim 1, in which the vibrating structure is substantially planar, substantially ring shaped structure having substantially identical carrier and response modes.

3. A method according to claim 2, in which a drive signal $V_{CD}\cos 2\alpha$ is applied to the fixed primary drive means at an angle of 0° and a signal $V_{CD}\sin 2\alpha$ is applied to the fixed secondary drive means at an angle of 45° to provide a resultant carrier mode drive force at an angle $\alpha$.

4. A method according to claim 3, in which the output of the fixed primary pick off means at an angle of 0° and of the fixed secondary pick off means at an angle 45° are combined to give a carrier mode pick off signal $V_{CPO}=(V_{PPO}\cos 2\alpha+V_{SPO}\sin 2\alpha)$ representative of the amplitude of vibrational motion resolved at an angle ($\alpha+270°$).

5. A method according to claim 3, in which the output of the fixed primary pick off means at an angle of 0° and of the fixed secondary pick off means at an angle 45° are combined to give a response mode pick off signal $V_{RPO}=(V_{SPO}\cos 2\alpha-V_{PPO}\sin 2\alpha)$ representative of the amplitude of vibrational motion resolved at an angle ($\alpha 135°$)

6. A method according to claim 2, in which a drive signal $-V_{RD}\sin 2\alpha$ is applied to the fixed primary drive means at an angle of 0° and a signal $V_{RD}\cos 2\alpha$ is applied to the fixed secondary drive means at an angle of 45° to provide a resultant response mode drive force at an angle ($\alpha+45°$).

7. A method according to claim 2, in which the carrier and response mode drive and pick off axes are angularly displaced uniformly around the vibrating structure at a fixed rate through a fixed angle and then displaced back to start position at the same rate.

8. A method according to claim 2, in which the carrier and response mode drive and pick off axes are angularly displaced around the vibrating structure at a constant rate in a single direction.

9. A method according to claim 2, in which the carrier and response mode drive and pick off axes are angularly displaced uniformly around the vibrating structure at a fixed rate through a fixed angle in an oscillatory manner on either side of a fixed start position.

10. A method according to claim 1, in which the predetermined scalefactor value $SF_{RATE}$ is the scalefactor measured when rotating the vibrating structure gyroscope in a conventional test manner.

11. Apparatus for measuring variation in scalefactor from a predetermined value for a vibrating structure gyroscope having a vibrating structure, a fixed primary and a fixed secondary drive means for putting and maintaining the vibrating structure in vibrating resonance, a fixed primary and a fixed secondary pick off means for detecting vibration of the vibrating structure, with the drive and pick off means being located radially around the vibrating structure, quadrature component and real component loop systems, automatic gain control and phase locked loop systems, a sin/cos pick off resolver for receiving signals from the primary and secondary pick off means and for outputting signals to the quadrature component and real component loop systems and to the automatic gain control and phase locked loop systems, a sin/cos drive resolver for receiving output signals from the quadrature component and real component loop systems and from the automatic gain control and phase locked loop systems and for feeding control signals to the primary and secondary drive means, and an angular displacement control for feeding angular displacement control signals to the sin/cos drive and pick off resolvers to control uniform displacement of the resolved carrier and response mode drives and pick offs axes angularly around the vibrating structure, with respect to a central axis of the vibrating structure, at a known rate.

12. Apparatus according to claim 11, wherein the vibrating structure is substantially planar, substantially ring shaped structure and has substantially identical carrier and response modes.

13. Apparatus according to claim 11 including demodulators for receiving signals from the sin/cos pick off resolver and for outputting demodulated signals to the quadrature component and real component loop systems, remodulators for receiving and remodulating output signals from the quadrature component and real component loop systems, demodulators for receiving signals from the sin/cos pick off resolver and for outputting demodulated signals to the automatic gain control and phase locked loop systems and a remodulator for receiving and remodulating signals outputted by the automatic gain control and phase locked loop system and for passing a remodulated output signal to the sin/cos drive resolver.

* * * * *